(12) United States Patent
Tsui

(10) Patent No.: US 8,847,448 B2
(45) Date of Patent: Sep. 30, 2014

(54) ELECTRIC GENERATOR FOR RAILROAD TRAIN IN COMBINATION

(75) Inventor: Yu-Ming Tsui, Taipei (TW)

(73) Assignees: Yu-Ming Tsui, Taipei (TW); Hsiang Hsu, Taipei (TW)

( * ) Notice: Subject to any disclaimer, the term of this patent is extended or adjusted under 35 U.S.C. 154(b) by 113 days.

(21) Appl. No.: 13/527,755

(22) Filed: Jun. 20, 2012

(65) Prior Publication Data
US 2013/0342085 A1 Dec. 26, 2013

(51) Int. Cl.
*H02K 21/22* (2006.01)

(52) U.S. Cl.
USPC .......................................... 310/75 C; 105/35

(58) Field of Classification Search
CPC ... H02K 21/22; H02K 21/222; H02K 7/0006; B60L 11/16; B60L 2200/26; B61C 17/06; B61C 9/48
USPC ............ 310/75 C; 105/35, 136, 137, 53, 96.1
See application file for complete search history.

(56) References Cited

U.S. PATENT DOCUMENTS

| | | | | |
|---|---|---|---|---|
| 680,619 | A | * | 8/1901 | Richter et al. ............... 310/67 R |
| 845,682 | A | * | 2/1907 | Bidwell ........................... 105/59 |
| 5,196,749 | A | * | 3/1993 | Palma et al. ..................... 310/91 |
| 5,698,913 | A | * | 12/1997 | Yagi et al. ........................ 105/53 |
| 7,466,049 | B1 | * | 12/2008 | Vancea ......................... 310/75 C |
| 7,750,515 | B1 | * | 7/2010 | Gabrys ........................... 310/61 |
| 2003/0020338 | A1 | * | 1/2003 | Hirsou et al. .................... 310/52 |
| 2011/0061956 | A1 | * | 3/2011 | Gilmore et al. ............. 310/67 R |

* cited by examiner

*Primary Examiner* — Michael Andrews
(74) *Attorney, Agent, or Firm* — Guice Patents PLLC

(57) ABSTRACT

An electric generator for a railroad train is provided with a stationary axle mounted to a base frame of a railroad car of the railroad train; a wheel mounted on either end of the stationary axle for rotation relative to both the stationary axle and a rail; an iron yoke secured to an outer surface of the wheel; a plurality of spaced, permanent magnets secured to an inner surface of the iron yoke; and a stator secured to either end of the stationary axle and including an armature winding thereon, the armature winding being spaced from the permanent magnets. In response to rotation of the wheel, electric current is produced by the armature winding due to a relative movement of the armature winding and a magnetic field generated by the permanent magnets.

4 Claims, 5 Drawing Sheets

US 8,847,448 B2

ELECTRIC GENERATOR FOR RAILROAD TRAIN IN COMBINATION

BACKGROUND OF THE INVENTION

1. Field of the Invention

The invention relates to vehicle propulsion and more particularly to an electric generator mounted on a wheel of a long distance train, the rotation of the wheel being capable of activating the electric generator to produce electric current, the power produced by the electric generators being sufficient for the normal operation of illumination and air conditioning of the train.

2. Description of Related Art

A conventional electric locomotive of a railroad train is powered by electricity from overhead lines. For example, a pantograph for rail lines is a hinged electric-rod device that collects electric current from overhead lines for electric trains. The pantograph typically connects to a one-wire line, with the track acting as the ground wire.

However, the cost of railroad electrification is very high due to, in part, the power consumption of passenger cars of a train. Thus, how to reduce the consumption of electricity of a railroad train is an issue to be addressed. The invention discussed below aims to take advantage of the rotating wheel as means of producing electricity when a train runs on a track.

SUMMARY OF THE INVENTION

It is therefore one object of the invention to provide an electric generator for a railroad train in combination comprising a stationary axle mounted to a base frame of a railroad car of the railroad train; a wheel mounted on either end of the axle for rotation relative to both the axle and a rail; an iron yoke secured to an outer surface of the wheel; a plurality of spaced, permanent magnets secured to an inner surface of the iron yoke; and a stator secured to either end of the axle and including an armature winding thereon, the armature winding being spaced from the permanent magnets; wherein in response to rotation of the wheel, electric current is produced by the armature winding due to a relative movement of the armature winding and a magnetic field generated by the permanent magnets.

The above and other objects, features and advantages of the invention will become apparent from the following detailed description taken with the accompanying drawings.

DETAILED DESCRIPTION OF THE INVENTION

Figure 1:
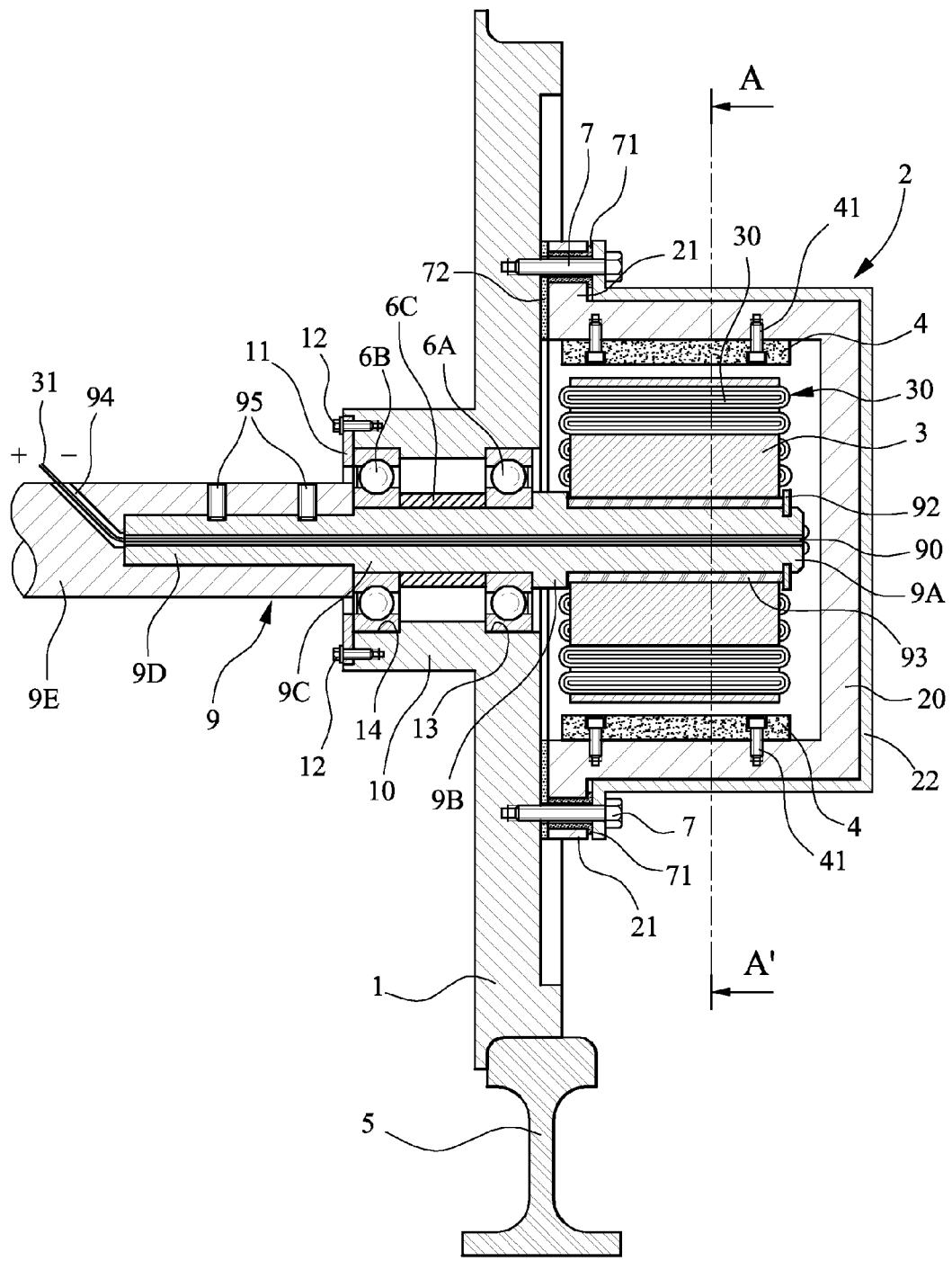
FIG. 1 is a longitudinal sectional view of an electric generator for a railroad train according to the invention, a wheel mounted to the electric generator, and a rail with the wheel rotatably disposed thereon.
Figure 2:
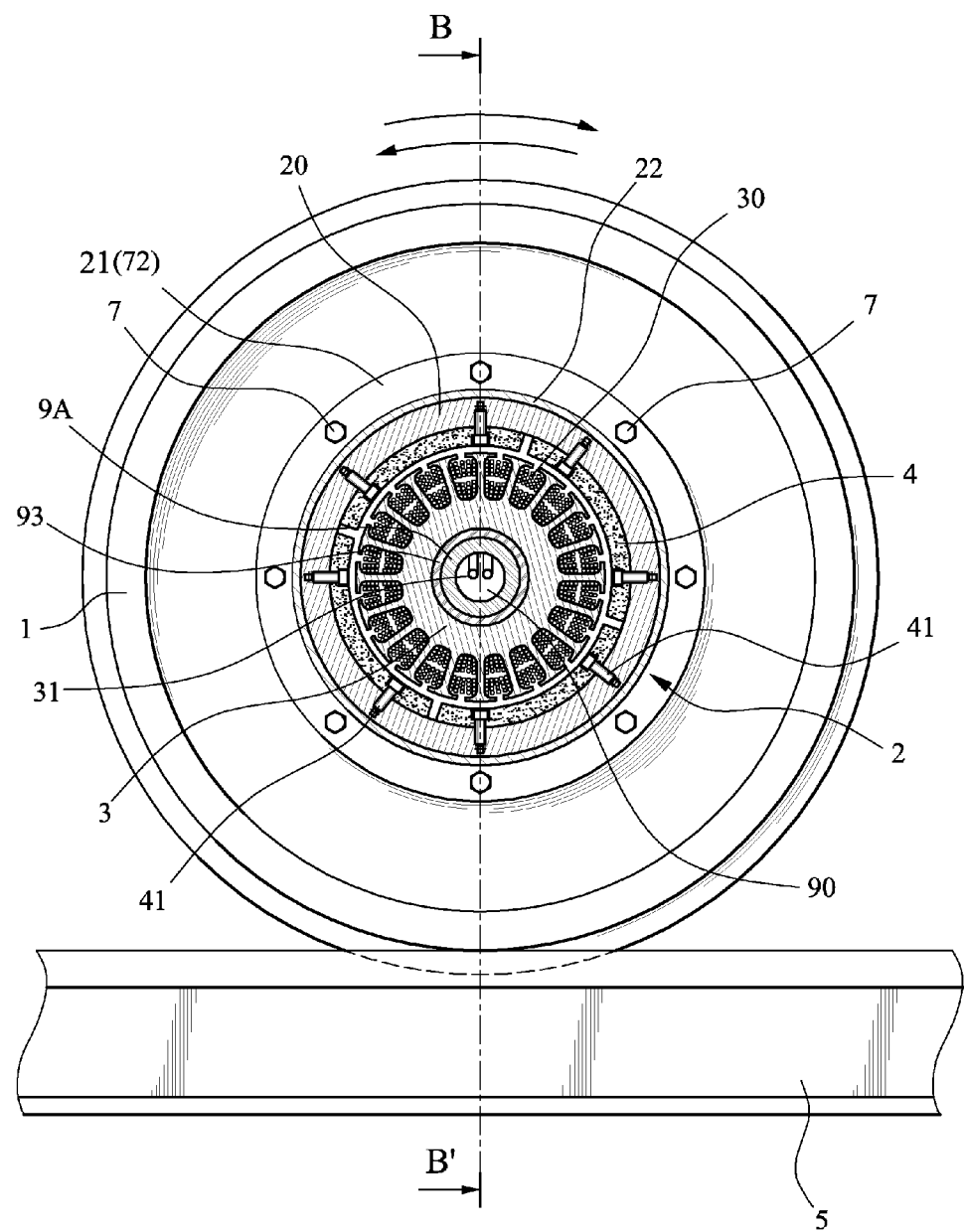
FIG. 2 is a side elevation of FIG. 1.
Figure 3:
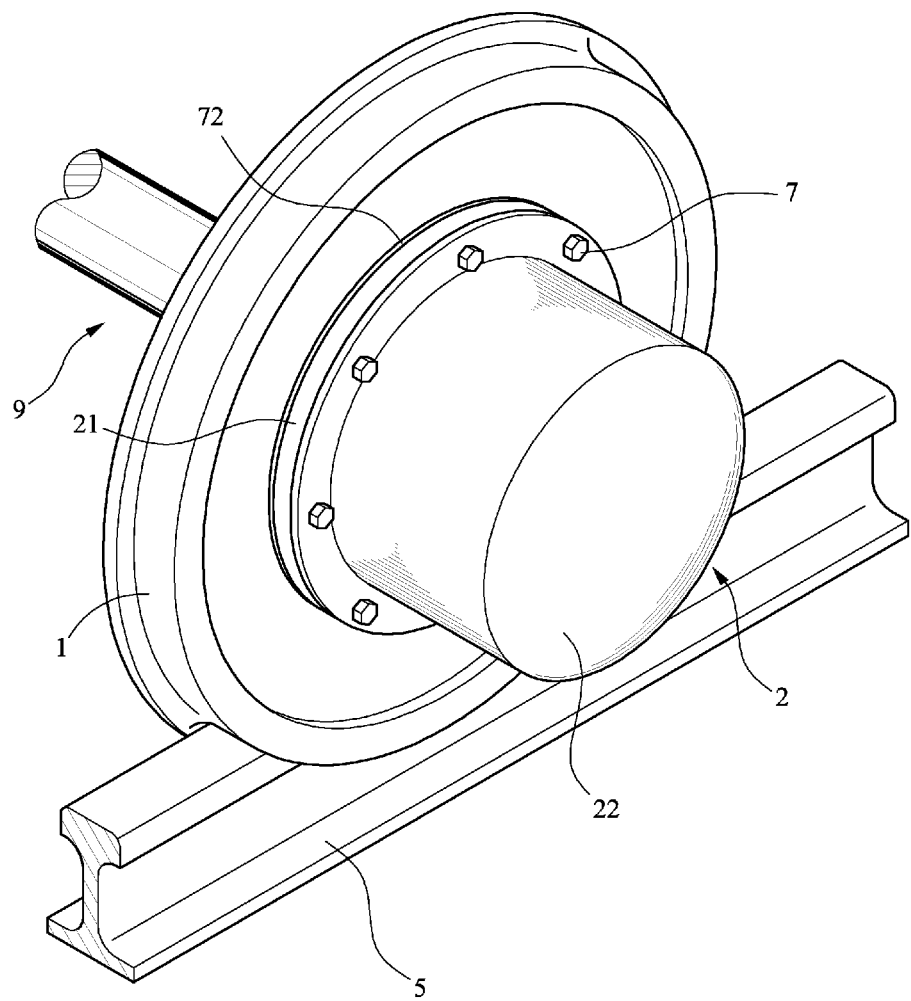
FIG. 3 is a perspective view of FIG. 1.

Referring to FIGS. 1 to 3, an electric generator 2 for a railroad train in accordance with the invention is shown. The electric generator 2 is mounted on a wheel 1 which is in turn rotatably mounted on a rail 5. An stationary axle 9 is secured to a center of the wheel 1 as detailed later.

The electric generator 2 comprises a cup-shaped iron yoke 20, a plurality of equally spaced, curved permanent magnets 4 secured to an inner surface of the iron yoke 20 by using a plurality of screws 41, and a stator 3 secured to the stationary axle 9 and surrounded by the permanent magnet 4 in a spaced fashion. Thus, the stator 3 may produce power by cutting magnetic lines from one rotating permanent magnet 4 to another rotating permanent magnet 4 as known in the art. The wheel 1 is rotatably supported on the stationary axle 9 by using a plurality of ball bearings 6A, 6B.

According to Faraday's law of induction, when a permanent magnet is moved relative to a conductor, or vice versa, an electromotive force is created. If a wire is connected through an electrical load, current will flow, and thus electrical energy is generated, converting the mechanical energy of motion to electrical energy.

In view of above description, in response to rotation of the wheel 1 (i.e., the train moving), power (i.e., electric current) will be produced by an armature winding 30 of the stator 3 due to the relative movement of the armature winding 30 and a magnetic field generated by the permanent magnets 4. The power is in turn supplied to a load (not shown) via conductors 31 through a lengthwise, central hole 90 of the stationary axle 9 and an opening 94 at one end of the hole 90. Rotor of a typical electric generator may rotate at a speed of 1,800 rpm (revolution per minute). For achieving the purpose, a selection of a wheel 1 having a desired diameter is sufficient.

In one example, the train speed is 280 km/hour (i.e., 4,667 m/minute) and the wheel 1 has a diameter of 0.8 m (i.e., perimeter being 2.51328 m). About 1,857 rpm can be calculated by dividing the train speed with the perimeter and it is very close to the desired speed of 1,800 rpm of the rotating wheel 1.

In another example, the train speed is 150 km/hour (i.e., 2,500 m/minute). Wheel diameter will be, 2,500 m/minute divided by 1,800 rpm and further divided by $\pi$, about 0.4421 m. In short, wheel diameter should be decreased if the cruising speed of a train decreases from 280 km/hr to 150 km/hr. Likewise, wheel diameter should be further decreased if the train speed further decreases from 150 km/hr to 100 km/hr. Moreover, magnetic field strength and power output should be decreased accordingly. One solution is to increase the number of the electric generators mounted to the wheels.

The wheel 1 is constructed as shown in FIG. 1. It is known that a force generates a motion of moment of inertia in direct proportion to the mass of an object and the greater of the mass the higher of the moment of inertia is. The permanent magnets 4 are mounted to the inner surface of the iron yoke 20. A cover 22 of non-permeance, stainless steel is put on the iron yoke 20 so that foreign objects can be prevented from being adhered to the iron yoke 20 when the train moves in high speed. A plurality of screws 7 are driven through the outward projecting edge of the cover 22 into the wheel 1 for fastening the cover 22 and the wheel 1 together.

The invention has the following configurations to prevent electric current from flowing from the rail to the circuitry of a railroad car (e.g., passenger car) and prevent power output of the electric generator 2 from being interfered by referring to FIGS. 1 and 2 specifically. A hard, insulating ring member 72 is compressed by the iron yoke 20 and the wheel 1 from opposing directions. A hard, insulating sleeve member 71 is provided between a flange edge 21 of the iron yoke 20 and each screw 7. Thus, no conduction is made between the iron yoke 20 and the screw 7. A hard, insulating sleeve 93 made of plastic steel is put on a first section 9A of the stationary axle 9 and compressed by and between the stator 3 and the first section 9A of the stationary axle 9. Thus, no conduction is made between the stator 3 and the stationary axle 9.

The axle 9 is stationary and mounted on the base frame of the train. It is envisaged by the invention that both the stationary axle 9 and the wheel 1 are made of non-permeance, stainless steel for preventing the magnetic field of the permanent magnets 4 from being adversely affected by the external magnetic field. Preferably, the rail 5 is the same as the rail for high speed railroad.

For facilitating replacement of the bearings 6A, 6B, the stationary axle 9 is comprised of the first section 9A, a second section 9B, a third section 9C, a fourth section 9D and a fifth section 9E. The first section 9A and the third section 9C have the same diameter. The second section 9B is a larger section than that of the first and third sections 9A and 9C. The fourth section 9D has a diameter less than that of the third section 9C. The fifth section 9E is a separate one and has a large diameter section at an intermediate portion of the stationary axle 9. The lesser diameter of fourth section 9D is inserted onto a central hole of the fifth section 9E secured by using a fixing device or a plurality of screws 95. The third section 9C is surrounded by the bearings 6A, 6B.

As shown in FIG. 1, A C-ring 92 is provided on an open end of the first section 9A to retain the hard, insulating sleeve 93 in place. The portion of the stator 3 facing the iron yoke 20 is prevented from moving away from the wheel 1 by the mounting of the C-ring 92 and the portion thereof facing the wheel 1 is prevented from moving due to the provision of the enlarged second section 9B.

A central hole 14 is provided in the wheel 1. The bearings 6A, 6B and the third section 9C are provided in the central hole 14. Further, a sleeve 6C is put on an intermediate portion of the third section 9C and has both ends in contact with the bearing 6A and the bearing 6B respectively. A plurality of screws 12 are driving through an end-plate 11 into the wheel 1 to fasten the end-plate 11 which is in turn tightly engaged with the bearing 6B for preventing the bearing 6B from moving out of the central hole 14.

For maintenance or parts replacement, a worker may unfasten the screws 7 to detach both the cover 22 and the iron yoke 20. Next, a crane is used to lift the fifth section 9E for disengaging the wheel 1 from the rail 5. Next, unfasten the screws 95 to disengage the fourth section 9D from the fifth section 9E. Next, unfasten the screws 12 to remove the end-plate 11 out of the wheel 1. Next, an elongated steel pipe (not shown) having an outer diameter less than an inner diameter of the bearings 6A or 6B is put on the fourth section 9D. Thus, a push of the steel pipe toward the wheel 1 may disengage the bearings 6A, 6B from the central hole 14 so that the stationary axle 9 and the wheel 1 may be separated. The bearings 6A, 6B are thus can be replaced with new ones.

Figure 4:
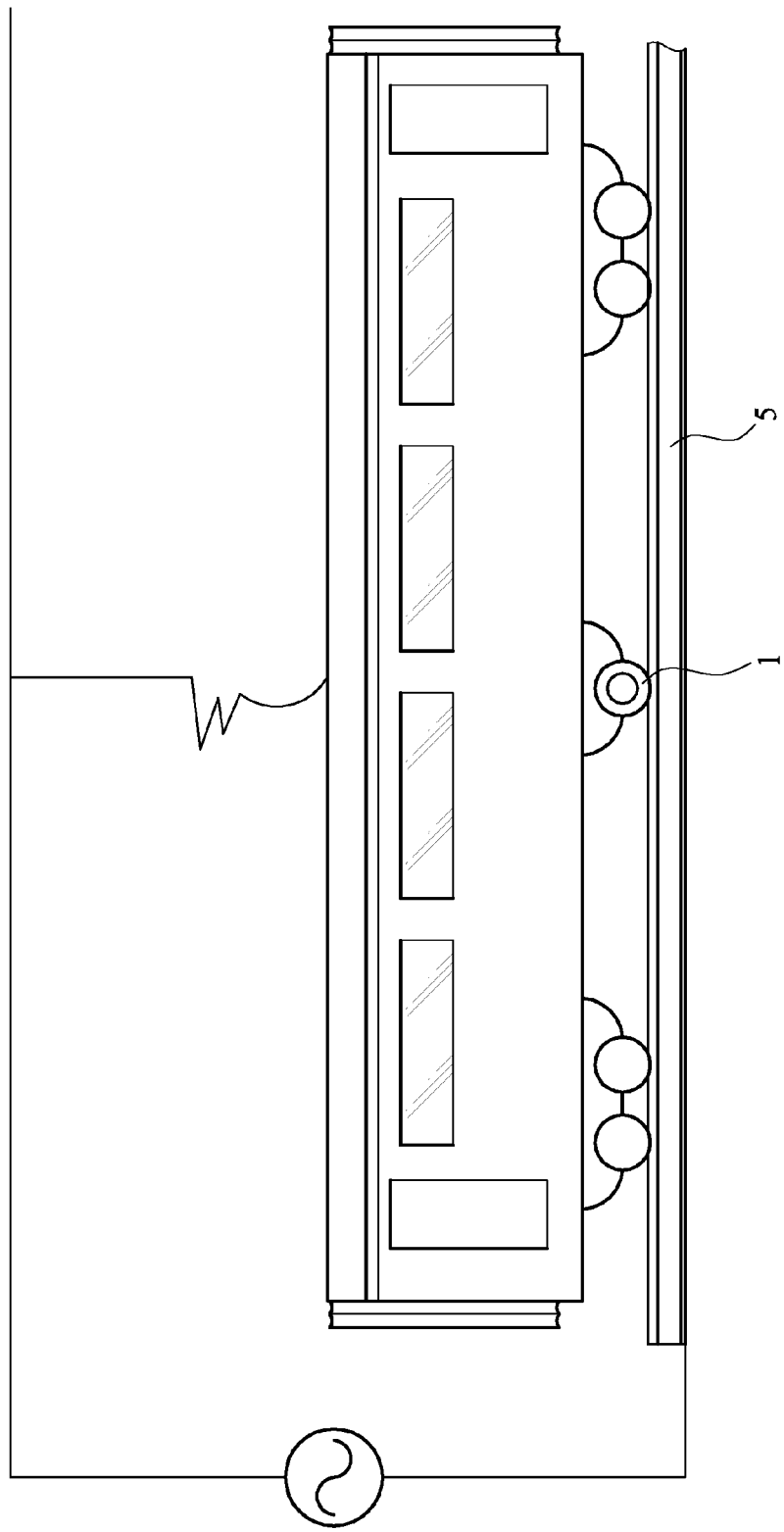
FIG. 4 is a side elevation showing the electric generator mounted on the wheel of a passenger car.

Referring to FIG. 4 in conjunction with FIGS. 1 to 3, it shows the electric generator 2 mounted on the wheel 1 of a passenger car. The stationary axle 9 is secured to the base frame of the passenger car.

Figure 5:
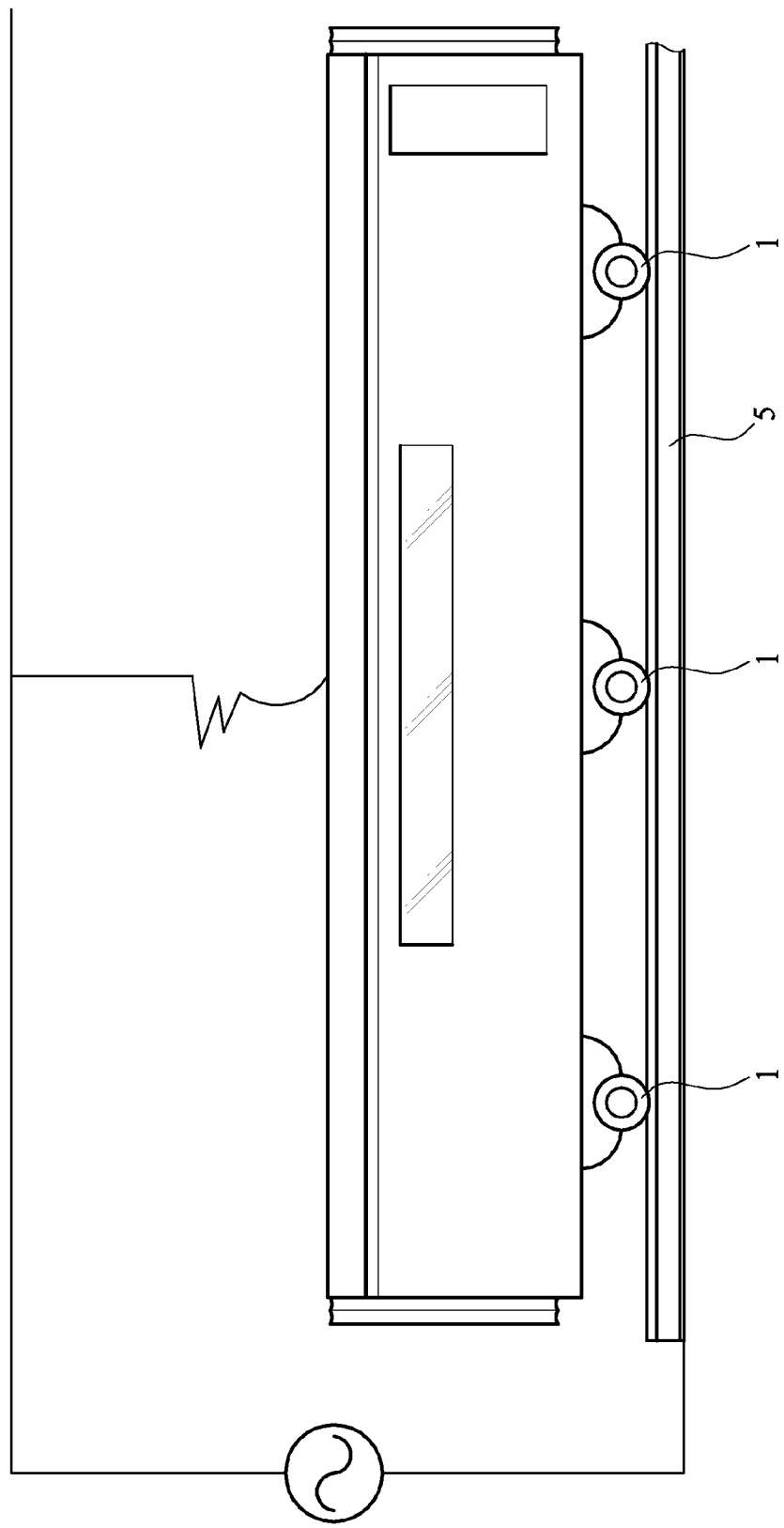
FIG. 5 is a view similar to FIG. 4 showing the electric generators mounted on the wheels of a power unit of an assistance locomotive.

Referring to FIG. 5 in conjunction with FIGS. 1 to 3, it shows the electric generators 2 mounted on the wheels 1 of a power unit of an assistant locomotive which is located at the rear end of the electric locomotive of a train. That is, this is a multi-electric generator arrangement. Within the power unit of an assistant locomotive, there are provided a power generation system including transformers, rectifiers, and rechargeable batteries, and a power control system including control panels.

It is envisaged by the invention that the electric generator for railroad train has the advantages of being a clear energy source, minimum noise, stable in operation, and great torque output.

While the invention has been described in terms of preferred embodiments, those skilled in the art will recognize that the invention can be practiced with modifications within the spirit and scope of the appended claims.

What is claimed is:

1. An electric generator for a railroad train in combination comprising:
    a stationary axle mounted to a base frame of a railroad car of the railroad train;
    a wheel mounted on either end of the stationary axle for rotation relative to both the stationary axle and a rail;
    an iron yoke secured to an outer surface of the wheel;
    a plurality of spaced, permanent magnets secured to an inner surface of the iron yoke; and
    a stator secured to either end of the stationary axle and including an armature winding thereon, the armature winding being spaced from the permanent magnets;
    wherein in response to rotation of the wheel, electric current is produced by the armature winding due to a relative movement of the armature winding and a magnetic field generated by the permanent magnets;
    wherein the stationary axle is a three-part-insert configuration, detachably tight locking together there between and comprises a small diameter section at one end, a large diameter section at an intermediate portion, and a small diameter section at the other end.

2. The electric generator of claim 1, wherein the small diameter section at both ends of the intermediate portion of the stationary axle further comprises a first axis section and a third axis section having a diameter the same as that of the first axis section, a second axis section having a larger diameter than that of the first axis section and the third axis section, and a fourth axis section having a smaller diameter than that of the first axis section and the third axis section.

3. The electric generator of claim 2, wherein the lesser diameter of fourth section is inserted onto a central hole of the intermediate portion of the stationary axle and secured by using a fixing device.

4. The electric generator of claim 2, wherein the third axis section is surrounded by bearings.

* * * * *